United States Patent [19]

Reiniger

[11] Patent Number: 4,933,125

[45] Date of Patent: Jun. 12, 1990

[54] PROCESS FOR MAKING CELLULOSE-CONTAINING PRODUCTS

[75] Inventor: Haigh M. Reiniger, Boston, Mass.

[73] Assignee: Altomar Trust II, Boston, Mass. ; by Kenneth Safe, Jr., Trustee

[21] Appl. No.: 342,954

[22] Filed: Apr. 25, 1989

Related U.S. Application Data

[62] Division of Ser. No. 146,339, Jan. 21, 1988.

[51] Int. Cl.[5] .............................................. C01B 31/00

[52] U.S. Cl. .................................. 264/29.4; 264/29.1; 264/40.5; 264/120; 264/122; 264/123

[58] Field of Search .............. 264/120, 122, 123, 29.1, 264/29.4, 40.5

[56] References Cited

U.S. PATENT DOCUMENTS 4,111,744 9/1978 Reiniger ................................ 264/85
4,216,179 8/1980 Lamberto et al. .................. 264/120

*Primary Examiner*—James J. Bell
*Attorney, Agent, or Firm*—Nutter, McClennen & Fish

[57] ABSTRACT

A fusion bonded fiber product is made by compressing between heated dies a mat of moisture-containing fibers of the type that change irreversibly to an amorphous nonglossy state that permits fiber-to-fiber bonding at a characteristic critical temperature. The further compression of the partially compacted mat is stopped when the mat is a small multiple of the desired caliper for the bonded product for a period sufficient to vaporize the moisture content of the mat. During this pause, most of the vaporized moisture content of the mat is expelled as saturated steam through the mat surfaces while the temperature of the mat is still well below the critical temperature. Then, the compression of the mat is continued under continuous consolidation to the final density and caliper of the fusion bonded product while the mat is heated to a temperature above the critical temperature. The heat and pressure from the fully compacted mat are removed and then the mat is released as said bonded product directly into the working space. Apparatus for carrying out the process is disclosed as is the product made by the process and apparatus.

11 Claims, 4 Drawing Sheets

PROCESS FOR MAKING CELLULOSE-CONTAINING PRODUCTS

This application is a division of application Ser. No. 146,339, filed Jan. 21, 1988.

This invention relates to a method and apparatus for the manufacture of cellulose-containing products such as fiberboard, particle board and the like. It relates more particularly to an improved technique for making efficiently fused cellulosic products having a unique internal structure which makes them unusually strong, stable and able to withstand adverse environmental conditions.

BACKGROUND OF THE INVENTION

In the conventional manufacture of products containing cellulose material, a mass of fibers, chips or other such cellulose-containing material along with a heat-hardenable binder, fillers, catalysts and other additives is deposited as a loose mat onto a belt conveyor system. While on the belt, the loose mat is usually transported through a preprocessor station where the mat is subjected to initial contact pressure which densifies and dewaters the mat before the mat is delivered to a press reactor station. There, through the use of contact heat and pressure, the mat is finally brought to the desired caliper and hardened state by thermal fusion of the binder material with the cellulosic fibers and other constituents of the compressed mat. After leaving the press station and after having cooled to an appropriate temperature, the board may then be transported to one or more downstream finishing stations where the board surfaces may be smoothed, embossed, etc. to form the finished product.

While that standard process has been used for many years to make various utilitarian cellulose-containing products such as underflooring and siding for the building industry, that old process and the products made thereby have several drawbacks. More particularly, the process itself is relatively time-consuming and expensive due particularly to the required residence time of the mat at the press reactor station. That is, in order to achieve the desired densification and bonding between the cellulose fibers and the binder material without carbonizing or burning the mat, the temperature in the press reactor must be kept relatively low. This prolongs the setting of the binder material and the fibers comprising the mat.

Also, when carrying out the standard process with standard press reactor apparatus, a large volume of steam and volatiles is generated within the press reactor due to pressure and heat-induced chemical reactions between the various mat constituents which are necessary to produce the finished product. This results in a pressure buildup which is difficult to control so as to allow the process to continue. In fact, since there is no provision for venting the steam and reaction gases except at the periphery of the mat, to avoid a blowout, the press platens usually have to be opened for a brief period to allow these gases to escape from the surfaces of the mat. This interruption of the process and the consequent pressure and temperature changes inflicted on the mat affect the ongoing internal chemical reactions to the extent that the resultant board product may have voids, blisters and density variations which adversely affect the overall quality of the product.

Also, if the prior process is practiced to make a cellulosic product suitable for exterior use, a substantial amount of heat-hardenable resin or binder material must be used to give the finished product sufficient wet strength and stability to render the product water and weather-resistant. When a mat containing one of „the usual resin and binder materials, e.g. ureaformaldehyde, is subjected to the heat and pressure of the press reactor, toxic and noxious fumes are emitted which present a distinct hazard to operating personnel and give rise to potential problems complying with OSHA standards. Furthermore, the product itself may emit such fumes in the field if subjected to sufficient heat, e.g. if it should catch fire. While this may not pose a problem if the board product is being used as a concrete form, for example, it could do so, if the product is used as underflooring in a house, for example.

In an effort to avoid many of the aforesaid difficulties inherent in the standard cellulosic product-making processes and in the products themselves, I devised a process of permanently fusing the fibers and particles of such cellulosic products under pressure, temperature and atmospheric conditions that produces a new state of fusion and chemical combining of the cellulosic fibers and particles. This technique reduces the time required to make the product, and it produces a product which is relatively strong, water and weather resistant, and yet requires only a fairly small amount of resin or binder material.

In accordance with this process, which is disclosed in my U.S. Pat. No. 4,111,744, the cellulose-containing material, including any additives such as binder, fillers, catalysts, synthetic fibers, etc., having an equilibrium moisture content in the range of 2% to 50%, is introduced as a mat into an oxygen-excluding reaction station. In that station, the mat is positioned between press dies or platens having a controlled temperature in the range of 450° F. to 800° F. Also, to internally heat the mat, supplemental heat in the form of RF energy is applied to the mat at an intensity level depending upon the nature of the cellulosic materials and the rate of reaction desired. In some cases, the application of the RF heating is delayed with the mat being held at less than full die pressure to commence scavenging the mat of air and volatiles and to preheat the mat before the supplemental energy is applied.

As described in that patent, the ambient temperature to which the fibrous mat is subjected is well beyond the normal carbonizing temperature of cellulose, i.e. about 400° F. However, the temperature of the mat is controlled in the oxygen-free atmosphere of the reaction station by microporous sheets that contact the opposite faces of the mat and are vented to the outside so as to permit the reaction process to continue without gas blowout, while keeping the carbonization of the mat to a minimum. As the platens close, the mat becomes fully consolidated to bring the mat to its final density and caliper, being heated all the time by the platens and RF source until the platens are opened to release the mat.

Then, as quickly as possible, the partially fused mat is transferred to an oxygen-excluding hot stacking station where a continuation of the fusion reaction is carried out under controlled temperature conditions. During the dwell time of the mat in the hot stacking station, which is substantially longer than the exposure time in the reaction station, the temperature of the mat is reduced gradually until the final product can be released from that station to the atmosphere at a temperature that enables the product to be handled or conveyed to one or more downstream finishing stations.

While the cellulose products made by my prior process are superior to those produced by the standard method described at the outset in terms of strength, stability, uniformity and weather resistance, there has been some difficulty in controlling the process carried out in the reaction station to avoid at least some discoloration and carbonizing of the finished product. The carbonizing is moderate and, to a large extent, confined to the surfaces of the product so that it does not materially affect the structural integrity of the product. However, it does adversely affect the appearance of the product, and therefore, is undesirable from a marketing standpoint if for no other reason.

My prior patented process is disadvantaged also in that it does require the presence of an oxygen-excluding stacking station immediately downstream from the reaction station to which the consolidated and partially fused mat must be transferred immediately to avoid total carbonizing or burning of the mat. Not only does the requirement for the stacking station increase capital and operating costs, but also, inevitably, at least some atmospheric oxygen reaches the hot mat during its transfer from the press reactor into the stacker giving rise to at least some carbonizing of the product. In addition, if the product is one which does include at least some binder material, product outgassing at the time of transfer can include toxic binder reaction products that can pose a hazard to workers in the vicinity of the process line.

Finally, the products resulting from my prior process, aside from being discolored, do have some variations in their internal compositions and densities apparently due to the fact that the chemical reactions occurring within the mats during the fusion reaction process are not uniform throughout the mats. Also, in some cases, their surface finishes are not as smooth as might be desired because of unwanted embossing of the mats by relatively large holes in the microporous sheets or plates that contact the mats during the reaction process.

SUMMARY OF THE INVENTION

Accordingly, this invention aims to improve my basic process for producing fusion bonded products so that these products are free of carbonizing and carborizing-caused discoloration.

A further object of the invention is to provide a process of this type which does not require the presence of an oxygen-excluding stacker downstream from the fusion reactor in the process line.

Yet another object of the invention is to provide a process for making fusion bonded products more efficiently and economically.

A further object of the invention is to provide a process for making cellulose-containing products which uses a minimal amount of binder material to produce a product with a given density and wet strength.

Yet another object is to provide a process for making cellulose-containing fusion bonded products having very uniform densities and superior surface finishes.

Another object is to provide such a process which minimizes the emission of toxic reaction volatiles from the process line.

A further object of the invention is to provide apparatus for making fusion-bonded products having one or more of the above-described advantages or benefits.

Still another object of my invention is to provide apparatus for optimizing the process conditions for making cellulose-containing products by my basic fusion reaction process.

Another object of the invention is to provide a fusion bonded product having a very uniform density and a superior surface finish or appearance.

Yet another object of the invention is to provide an improved gas emission control plate for a fusion reaction station and a method of making same.

Briefly, in accordance with the present process, the fibrous woven or nonwoven mat, web or sheet which may be, preformed or prepressed, is introduced between the heated dies or platens of an oxygen-excluding press reactor of the general type described in my prior U.S. Pat. No. 4,111,744. However, the reaction process carried out in the reactor is controlled quite differently than before so as to promote the removal from within the mat of most if not all of the moisture therein as wet or saturated steam while the internal temperature of the mat is still well below the critical temperature of the mat material. This critical temperature is the temperature at which the mat fibers collapse, coalesce and assume an irreversible amorphous nonglassy state in which they can fuse together without the assistance of any ancillary resin or binder material. Cellulose fibers and particles have a characteristic critical temperature, as do certain synthetic materials such as polyester (Dacron) and nylon. Only after almost all of the moisture has been purged from the mat as wet steam is the fusion reaction allowed to proceed and the mat consolidated to its final density and caliper.

Such control of the reaction process is achieved in the present instance by the application of precise pressure and temperature regimes to the mat, coupled with the use of an improved vented gas emission control plate or sheet in contact with the mat for controlling gaseous emissions from the mat.

More particularly, after the mat is introduced into the reactor between preheated dies at least one of which is faced with a vented gas emission control plate, the dies are caused to follow a closing program to final caliper that includes a pause or intermission at a point in the closing program when the mat is only partially compacted or consolidated, typically at a small multiple of the final caliper. During this pause, the mat is heated internally sufficiently to vaporize the moisture content of the mat, and the temperature and pressure within the mat are controlled by uniquely small and densely distributed holes or pores in the emission control plates so that the vapor exists as wet or saturated steam.

During this pause in the compression program, which may last for a period of 10 to 120 seconds depending upon the moisture content of the mat and the caliper of the final product, a large volume of wet steam and low temperature reaction volatiles is generated within the partially compacted mat. These internally generated gases, in their escape from the mat, create a complex distribution or network of gas emission microchannels that extends from the interior of the mat to locations on the mat surfaces more or less congruent to the tiny, densely packed holes or pores in the vented emission control plates contacting those surfaces. Resultantly, the hot wet steam is brought into intimate contact uniformly with substantially all of the cellulose fibers and other constituents of the mat thereby conditioning those constituents uniformly for final fusion. More particularly, the contact of the wet steam heats and dissolves the water soluble resin present in the middle lamella that binds the fibers together. This permeation of the mat by the wet steam and reaction volatiles during the pause in the compaction of the mat is enhanced due to the appreciable back pressure developed by the emission control plates at the mat surfaces.

As will be described in greater detail later, contrary to the teaching in my prior patent, the unusually small and uniformly densely packed pores or holes in the gas emission control plates permit the escape of just enough gas volume from the partially compacted mat as to maintain the steam in a saturated condition throughout the mat during this pause step of the process. Surprisingly enough, as will be seen, even though the holes or pores in the plates are very small, they do not tend to become plugged by mat material which plugging could upset the desired gas temperature and pressure conditions imposed within the mat during the reaction process.

The aforesaid generation and controlled flow of wet steam from the mat interior to the mat surfaces through the distribution of tiny densely packed gas transmission channels therein keeps the mat interior temperature relatively low and quickly flushes any free (atmospheric) oxygen from the mat. Therefore, that effluent is no longer available to promote carbonization of the mat when the mat internal temperature rises above the critical temperature of the mat fibers.

The flow of wet steam from the mat through the plates also cools those plates sufficiently to maintain the temperature of the mat surfaces in contact therewith below that carbonizing temperature even though the press reactor dies or platens may be heated to a temperature above that value.

Further, as we shall see, the steam-produced distribution channels assure thorough and intimate contact of residual superheated steam and hot secondary reaction gases with the mat constituents and the expulsion of those gases from the compacting mat during the remainder of the fusion reaction process about to be described.

At the conclusion of the pause in the compaction of the mat, when the mat internal temperature will have equalized below the critical temperature thereby preventing premature carbonization of the mat fibers, closing of the reactor dies is continued to bring the mat under continuous consolidation to its final density and caliper, i.e. those of the finished product.

As the mat is compacted and consolidated between the closing heated reactor dies, the mat internal temperature increases rapidly due not only due to the heat deriving from the dies and any optional supplemental heating, but also due to internal exothermic fusion reactions occurring between the mat fibers, any binder and resin material present and the other mat constituents. Resultantly, any residual moisture in the compacting mat flashes to superheated steam which, along with hot secondary fusion reaction gases evolving in the middle lamella and elsewhere around the mat fibers, immediately propagates to the aforesaid distribution of microchannels therein and uniformly permeates the mat. As these channels are very fine and closely packed, the hot gases are brought into very intimate contact with essentially each and every fiber in the mat. Due to the back pressure developed by the emission control plates, the gas pressure within the mat is kept quite high so that the flowing gases maintain the integrity of the network of microchannels even as the mat is being compacted continuously to final caliper. Thus the entire mat is subjected to substantially the same temperature, pressure and other fusion reaction conditions as the mat becomes fully consolidated thereby promoting and accelerating thorough and uniform interfiber fusion throughout the mat.

Furthermore, since all free oxygen and most of the moisture was flushed from the mat during the pause step described above, there is very little, if, any oxygen available to promote carbonizing of the mat constituents during the fusion bonding of those constituents when the mat temperature becomes quite high. Also, even during the latter stage of the process, the control plates cover most of the mat surface area and gas emission is perpendicular to the mat surfaces through the tiny holes in the plates so that carbonizing and discoloration of the mat surfaces are minimized.

At final caliper, any supplemental heat applied to the mat at the beginning of the pause step described above is stopped and preferably the mat is held in its completely consolidated condition for a brief period. At this point, the secondary fusion reactions will have been completed, terminating the evolution of reaction gases within the mat and allowing the mat microchannels to collapse as the end gases therein are expelled through the surface of the mat. The fully consolidated mat now has substantially the same composition and density throughout so that the reactor dies can be opened to discharge the completed product from the press reactor.

It is important to appreciate that when the dies are opened, the product can be exposed immediately to the working environment because, by virtue of my process, substantially all of the fusion reactions within the product will have been completed before the dies are opened and the product will have cured and diversified sufficiently to prevent infusion into the product of additional oxygen from the environment. By the same token, the product surfaces will have been shielded and their temperature maintained sufficiently low by the gas emission control plates contacting those surfaces as to prevent carbonizing and discoloration of those surfaces. Further, due to the small size of the holes in the emission control plates, the product surfaces do not even have embossings corresponding to those holes as do the products made by my prior process. As a result, a fusion bonded product made by the present process and apparatus has a substantially uniform density throughout and has substantially no undercure, precure, voids, bulges, blisters or surface irregularities caused by uneven process conditions imposed on the product precursor or mat.

While my process and apparatus do produce a superior quality product, they achieve this result in less time and at less cost as compared to prior processes for making products of this type. In particular, this process line does not require a hot stacker to control the final fusion of the mat constituents. The invention should, therefore, find wide application in the manufacture of fiberboard, underlayment, particleboard, printed circuit boards, molded laminates, pressed parts, compression bonded or molded webs, shapes and sheets and other such products containing cellulose fibers and/or certain polyester-like synthetic fibers having similar fusion reaction characteristics.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
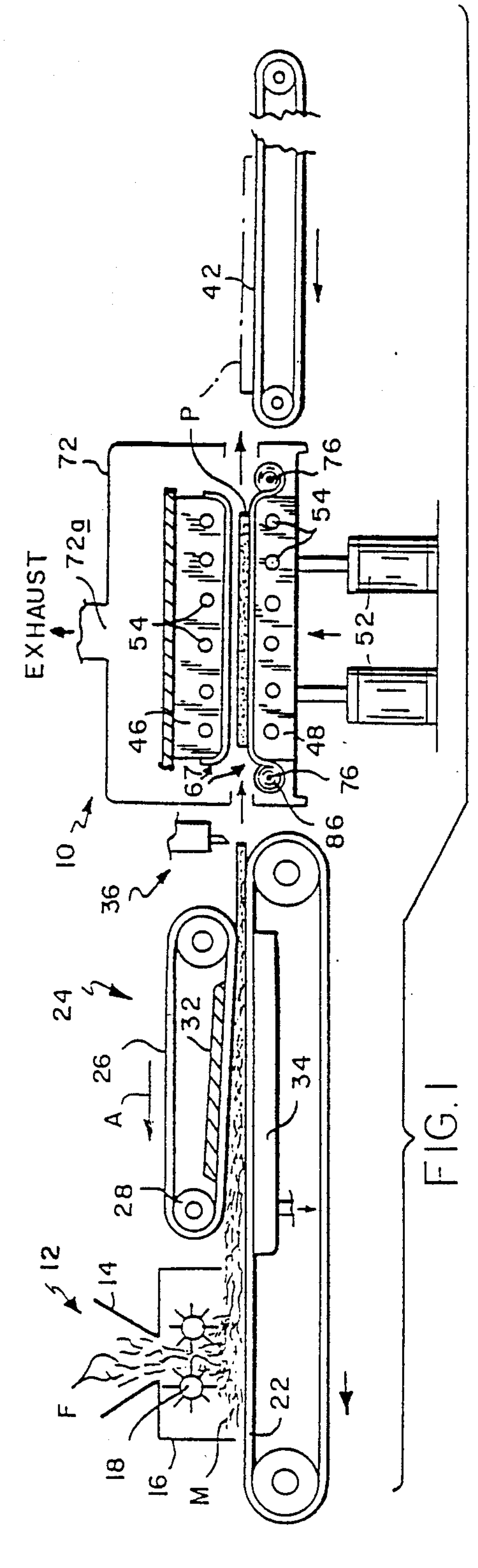
FIG. 1 is a diagrammatic view of apparatus for processing cellulose and certain other fibers into a rigid board product and which incorporates a reactor made in accordance with this invention.

Refer first to FIG. 1 of the drawings which shows apparatus for making a board product P from cellulose-containing fibers F. Except for certain parts of the press reactor 10 therein and the operation of that reactor to be described herein, the FIG. 1 apparatus is more or less the same as the apparatus described in my prior U.S. Pat. No. 4,111,744. Accordingly, the description in that patent is hereby incorporated by reference herein.

Thus, the FIG. 1 apparatus includes a mat former station indicated generally at 12 at which cellulose-containing fibers F are fed into a hopper 14 which leads down into a distribution chamber 16 containing rotating agitators 18. These agitators intercept the fibers and agitate, fluff and intermix them before distributing them onto a moving horizontal porous conveyor belt 22 as a loosely interlaced mat M. The fibers F may be wood fibers or vegetable fibers or mixtures of both and may include organic or inorganic additives such as fillers, e.g. walnut shells, cotton stems and silica, natural or synthetic fibers, e.g. Dacron polyester acrylic and nylon and resin or binder material, e.g. ureaformaldehyde. Usually, prior to being introduced into hopper 14, the fibers F are dried so that they have a certain moisture content, usually less than 50% by weight.

The conveyor belt 22 feeds the loose mat M to a conventional prepress or preforming apparatus shown generally at 24 which produces an initial compression and densification of the fibrous mat M. The illustrated apparatus 24 comprises an inclined endless belt 26 stretched between a pair of rollers 28 disposed above conveyor belt 22 with the lower stretch of the conveyor belt 26 passing under an inclined pressure shoe 32 spaced above conveyor belt 22. At least one of the rollers 28 is driven to move the belt 26 in the direction of the arrow A in FIG. 1. As the mat is transported between conveyor belts 22 and 26, it is gradually compressed and compacted with excess water being squeezed out through the porous conveyor belt 22. If desired, apparatus 24 may include a conventional suction box 34 under the upper stretch of belt 22 to help dewater the mat.

The conveyor belt 22 then transports the preformed mat M to a conventional cutting station shown generally at 36 where the mat is cut into predetermined lengths before being loaded into the press reactor 10 by conventional loading means (not shown).

Following its processing in the press reactor 10 in a manner to be described presently, the mat, now consolidated to its final density and caliper to form the completed cellulose-containing product P, is discharged onto a conveyor belt 42 which transports the product to an outside storage area or to one or another downstream station where the product may be cut or shaped or its surfaces finished or embossed by means well known in the art.

Figure 2:
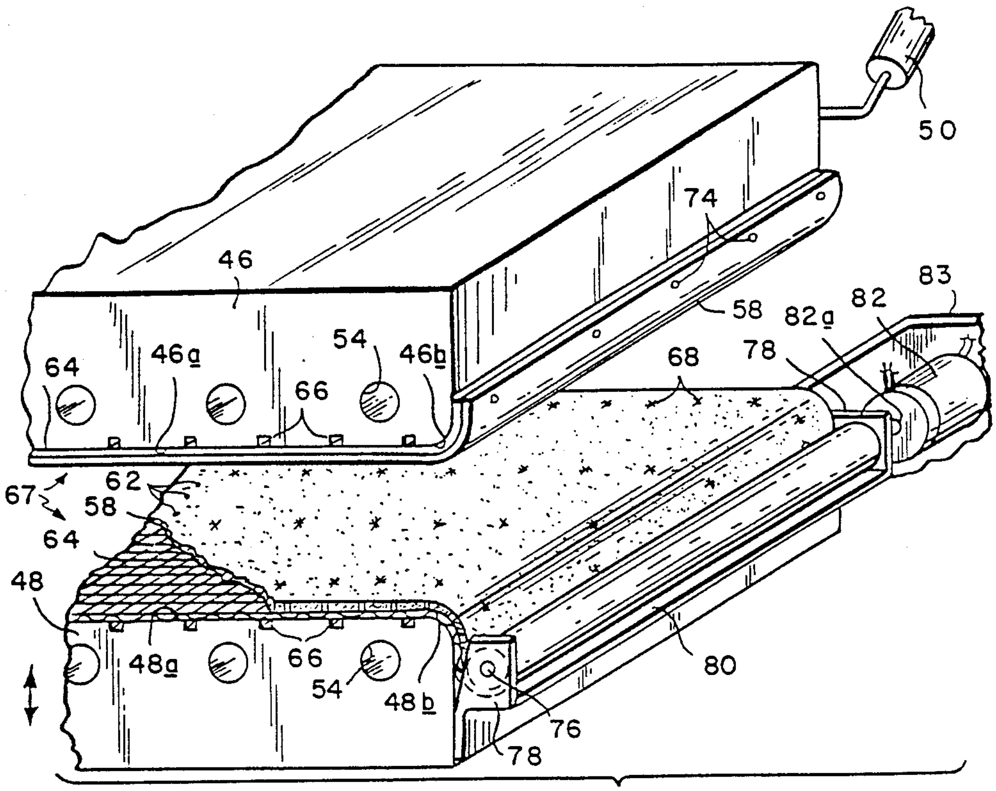
FIG. 2 is a fragmentary isometric view on a larger scale with parts broken away illustrating certain parts of the reactor in FIG. 1 in greater detail.

Referring now to FIGS. 1 and 2, the structure of press reactor 10 is similar in most respects to the reactor described in my above-identified patent in that it includes a pair of upper and lower dies 46 and 48 which extend the full width of the mat M. For ease of illustration, we have shown the press reactor 10 as including only a single pair of dies, one of which, e.g. die 46, is fixed, and the other of which, i.e. die 48, is movable vertically by a pair of double acting pistons 52. It should be understood, however, that reactor 10 may include a stack of such dies as described in my prior patent so that a plurality of products P can be formed simultaneously.

Dies 46 and 48 are made of a highly thermally-conductive metal such as aluminum or steel and they are heated by suitable means such as by circulating hot oil through a multiplicity of passages 54 extending through the interiors of the dies. Typically the dies are heated to a temperature in the range of 300° F. to 500 ° F. Preferably also, provision is made for adding supplemental heat to the interior of mat M being processed in press reactor 10. In the illustrated apparatus, the supplemental heat is provided by applying RF energy to die 46 by way of a coaxial cable 50. Since the cellulose fibers of mat M constitute a dielectric, this RF energy suffices to heat those fibers so that the mat M as a whole is heated internally. Of course, the supplemental heat may be applied by other known means such as electric heaters installed in dies 46 and 48, an induction heater or even a laser if spot fusion bonding of the mat is desired.

As best seen in FIG. 2, the working surface of at least one, and preferably both, dies 46 and 48 is covered by a flexible gas emission control plate or sheet 58 preferably made of a corrosion-resistant, highly thermally-conductive material such as stainless steel, although it could be coated with or made entirely of a high temperature-resistant plastic material such as PTFE. A sintered metal sheet is also feasible. Plate 58 is quite thin, i.e. 0.015 inch maximum with 0.002 to 0.010 inch being preferred, and its opposite faces are quite smooth and flat. Each plate 58 is formed with a multiplicity of tiny densely packed holes or pores 62 distributed relatively uniformly over the plate area. Typically the pores or holes have diameters in the range of 0.001 to 0.010 inch. The density of the holes is in the range of 500 to 3000 holes/in.$^2$ with the combination of hole size and density giving the plate 58 a transmission factor (air or light) of about 20% to 40%. One method of forming a uniform distribution of such densely packed tiny holes or pores in a thin flexible plate such as plate 58 will be described in detail later in connection with FIG. 7.

Preferably there is sandwiched between each plate 58 and the working surface *46a*, *48a* of the corresponding die 46, 48 a flexible mesh screen 64 made of wire or woven fiberglass which functions as a support for plate 58 and which provides gas-transmitting channels or passages between the plate holes 62 and the edges of dies 46, 48. Such lateral transmission of gases to the edges of the dies may be encouraged further by the inclusion of small slots 66 in the die working surfaces 46*a*, 48*a* as shown in FIG. 2. Desirably also, the emission control plate 58 and the corresponding screen 64 are permanently secured together face-to-face to form a unitary flexible plate unit 67 by an array of spot welds or bonds 68 distributed over the common area of those components as shown in FIG. 2.

Any reaction gases conducted to the edges of the dies by way of plate units 67 and slots 66 are excluded from the working space by a housing or hood 72 (FIG. 1) which surrounds the dies, those gases being exhausted from the housing by way of an exhaust port 72*a* leading to a vacuum source so that those gases, many of which are toxic or noxious, can be rendered harmless or otherwise disposed of without injury to operating personnel or to the public in general.

Each plate unit 67 may be affixed to the working surface of the associated die 46, 48 by suitable known means. Thus in the apparatus shown in FIG. 2, the upper unit 67 is fixedly attached to die 46 by threaded fasteners 74 extending through opposite margins of that unit 67 and turned down into threaded holes (not shown) in the ends of die 46. Alternatively, a special attachment that permits rolling transfer of the mat M may be used.

This attachment, shown on die 48 in FIGS. 1 and 2, is particularly useful because it enables the plate unit 67 on that die to assist in loading mats M into and unloading them from reactor 10. Also, as will be described, it minimizes the likelihood of the plate holes or pores 62 becoming clogged by the constituents of the mat M being processed in reactor 10. As shown in those drawing figures, each end of the lower plate unit 67 is wound about an axle 76 whose opposite ends are rotatively mounted in brackets 78 supported by a rail 80 secured to the adjacent ends of die 48. At least one of the axles 76, e.g. the righthand one, is coupled to the shaft 82*a* of a step motor 82 mounted by a bracket 83 to the side of die 48. The lefthand axle 76 depicted in FIG. 1 is spring-loaded by conventional spring means 86 acting between the ends of that axle and the adjacent brackets 78 so as to maintain the plate unit 67 taut against die working surface 48*a* at any given position of motor shaft 82*a*. Preferably also, the opposite end edges 46*b*, 48*b* of both dies 46, 48 are rounded as shown so that the plate units 67 make smooth and gradual transitions over those edges.

Before loading a mat M into press reactor 10, the motor 82 is controlled so that the excess length of the lower plate unit 67 (i.e. more than twice the die length) is wound up on the lefthand axle 76. Then as the mat is being loaded into the reactor, motor 82 is controlled to advance that plate unit 67 toward the right at the rate of mat entry so that there is mimimal relative movement between the mat M and the lower plate unit 67. This minimizes the likelihood of mat fibers finding their way into and becoming lodged in the tiny plate holes 62. As will become apparent, such clogging of holes 62 could prevent the plate from performing its proper function during the reaction process carried out in reactor 10.

Likewise, when a completed product P is being discharged from the press reactor 10 after the dies 46 and 48 have opened, the motor 82 can be controlled to further advance the plate unit 67 on die 48 to the right so that there is also a rolling transfer of the product P from the reactor onto conveyor belt 42. This results in the sheet unit 67 being pulled away from the underside of the discharging product P gradually so that in the unlikely event that mat fibers did form plugs in the tiny plate holes 62 during the reaction process in reactor 10, those correspondingly tiny plugs will be pulled out of those holes as the product P leaves the reactor.

As an alternative to the rolling transfer arrangement specifically illustrated herein, the plate unit 67 on die 48 can be formed as an endless belt or loop which is advanced toward the right on die surface 48*a* by a suitable motor-driven roller (not shown) engaging that web.

Figures 3A, 3B, 3C, 3D:
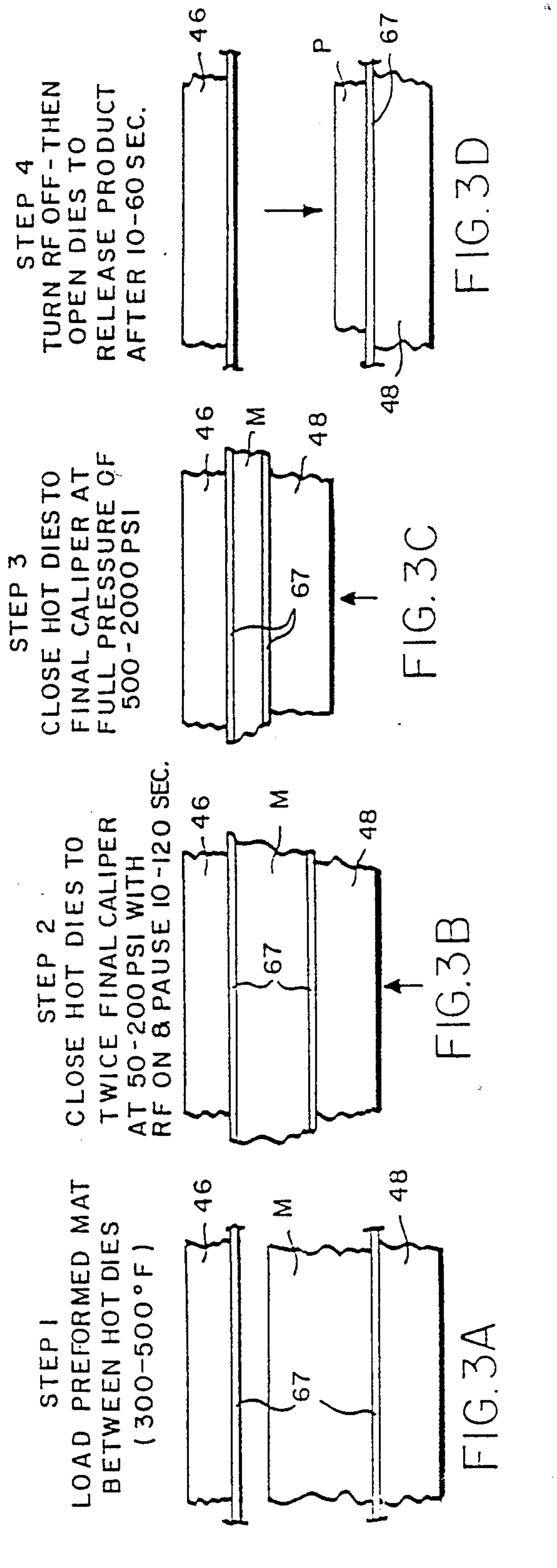
FIGS. 3A to 3D are fragmentary elevational views on a still larger scale of the dies or platens of the reactor in FIG. 1 and illustrating the various steps of my process.

Refer now to FIGS. 3A to D and 4 which help to describe the reaction process that takes place in press reactor 10. As shown in FIG. 3A, when the preformed or prepressed mat M is loaded into the reactor 10, the dies 46 and 48 are, already heated to their operating temperature, typically 300° F. to 500° F. They are also fully open so that the mat M is supported on the lower plate unit 67, with the upper surface of the mat being spaced from the upper unit 67. At this initial stage of the process, the mat for making a product P one-eighth inch thick, for example, may have a thickness of 2 to 6 inches depending upon the ultimate density desired for that product.

Figure 4:
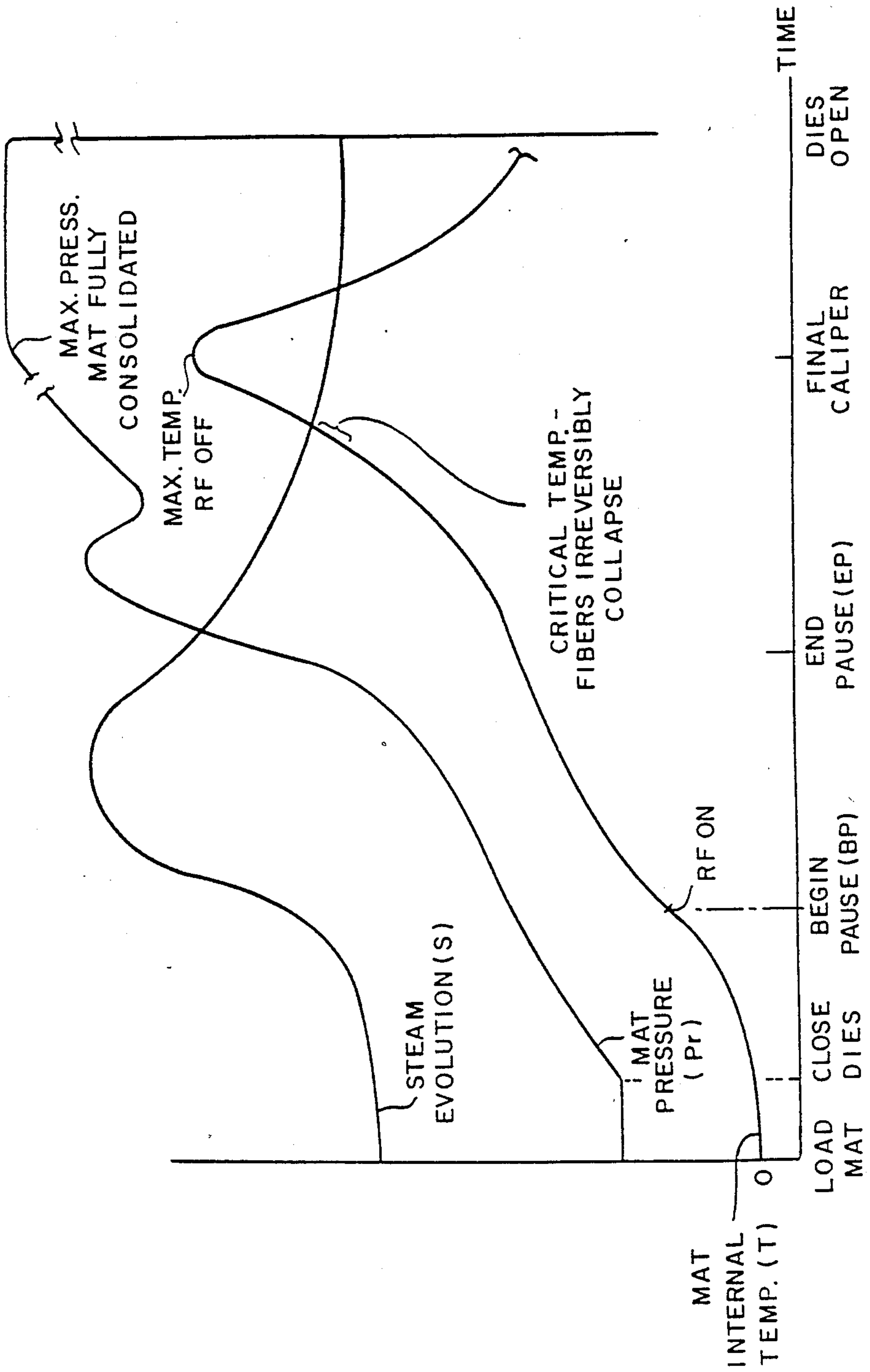
FIG. 4 is a graphical view which helps to explain the operation of the reactor in FIG. 1.

As soon as the mat M is deposited thusly in the reactor, it begins to be heated by the single die 48 as shown by the waveform T in FIG. 4. The two dies are then closed by actuating pistons 52 (FIG. 1) to raise die 48 in accordance with the selected compression program or profile which is usually, but not necessarily, a linear one. As the dies close, the upper surface of mat M is brought into contact with the upper plate 58 at the undersurface of die 46 and the mat is progressively compressed so that it becomes increasingly densified and compacted. As shown by waveform T, the internal temperature of the mat increases fairly rapidly as the fiber contacts with the heated plates and with each other become more intimate and close. Also, the pressure within the mat increases in a more or less linear fashion as seen from waveform $P_r$ in FIG. 4.

When, as shown in FIG. 3B, the dies have closed to reduce the caliper of the mat M to a small multiple of the caliper of the final product P, e.g. $\frac{1}{4}$ to $\frac{3}{4}$ inch for $\frac{1}{8}$ inch product P; 2 to 3 inches for a $1\frac{1}{2}$ inch product P, the closing of the dies is interrupted so that there is a pause in the compaction of the mat when the internal temperature of the mat is still relatively low and well below the critical temperature of the fibers comprising the mat. As stated above, this is the temperature at which cellulose fibers and certain other fibers such as polyester (Dacron) and nylon, for example, irreversibly collapse and coalesce and otherwise become conditioned to permit them to be fused to one another and to the other constituents of the mat. For cellulose, this temperature is about 390° F.–420° F. Also, at the commencement of the pause, RF energy may be applied to the dies by way of cable 50 (FIG. 2) or by other means to heat the mat internally if supplemental heating is desired as when the mat has a high moisture content and/or is quite thick. Depending upon the desired density and caliper of the final product P, during the pause, the mat is maintained at a die pressure in the range of 50 to 200 psi for a period of about 10 to 120 seconds.

As the partially compacted mat reposes thusly between the stationary heated dies, the mat is heated sufficiently to turn the moisture content of the mat to wet or saturated steam. A substantial volume of such steam is evolved as shown by waveform S in FIG. 4. Furthermore, even though the die 48 is stationary, as shown in FIG. 4, the mat internal pressure $P_r$ continues to rise quite rapidly due to the generation of this steam and of low temperature reaction volatiles within the mat and the controlled venting of these gases by the plate units 67 contacting the mat surfaces.

Figure 5:
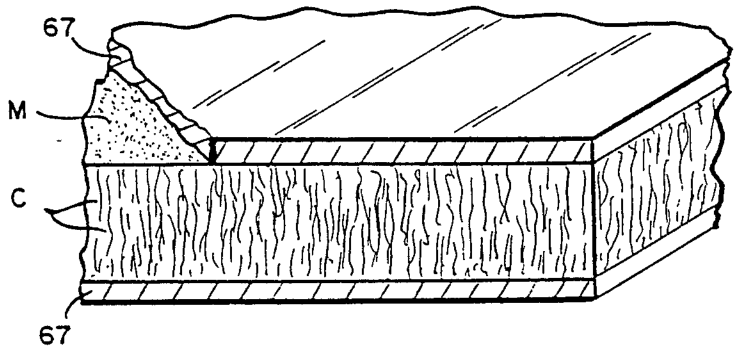
FIG. 5 is a fragmentary isometric view showing a mat partially compacted and formed by the reactor in FIG. 1.

In other words, the perforated emission plates 58 develop back pressures which are reflected into the partially compacted mat so that the gas pressure increases within the essentially fixed volume of the mat. As the wet steam builds up within the mat, it develops a network or distribution of tiny microchannels which extend from within the mat to locations on the mat surfaces more or less congruent to the holes in the plates. These microchannels are indicated at C in FIG. 5. While they are shown there as being spaced apart for ease of illustration, in actuality, channels C are relatively densely packed. In other words, due to the very small size and high density of the plate holes or pore 62, correspondingly fine and densely packed microchannels C are formed in the partially compacted mat M which convey the saturated steam into very intimate contact with the mat constituents, with the steam permeating all portions of the mat to substantially the same extent. The hot wet steam softens the mat fibers and dissolves the water soluble natural resin present in the middle lamella that binds the individual cellulose fibers together. Any steam evolved there propagates to the existing microchannels thus further extending the channel network right into the regions between the individual fibers of the mat.

While the mat internal temperature and pressure are increased during the aforesaid pause in the mat consolidation process, the flow from within the mat of the saturated steam and reaction volatiles prevents blowout and keeps the mat internal temperature well below the critical temperature of the mat fibers, typically 390° F.-420° F. for cellulose and well below the carbonizing temperature of those fibers which is about 400° F. That gas flow from within the mat to and through the plate holes 62 also cools the plates 58 sufficiently to maintain the mat surfaces in contact therewith below that carbonizing temperature even though the dies 46 and 48 are heated to a temperature of 500° F. or more. Thus during this time, as the mat temperature equalizes there is no degradation or discoloration of the mat due to overheating or premature carbonizing of the mat constituents. Finally, as noted above, the expelled gases develop the network of microchannels C through the mat; these will play an important part in the next stage of my process.

By the end of the pause period, most of the moisture content of the mat will have been expelled from the mat as saturated steam so that the evolution of steam within the mat falls off rapidly as shown in FIG. 4. Therefore, the oxygen atoms bound in the water molecules can no longer disassociate and promote carbonizing of the mat constituents. Furthermore, all free oxygen present initially in the mat will have been entrained in the escaping steam and flushed from the mat.

At this point, the closing of the dies is continued as shown in FIG. 3C. With very little residual moisture remaining in the mat, even without the supplemental heat, the mat temperature rises quite rapidly to the critical temperature (i.e. about 390° F. to 420° F. for cellulose) because some of the fusion reactions are exothermic. Resultantly, the fibers irreversibly collapse and assume their amorphous nonglassy state in which they begin to fuse to one another and to the other constituents of the mat. The continued closing of the dies also increases the pressure on the mat as the consolidation of the mat is resumed. Actually, as shown by waveform $P_r$ in FIG. 4, there is usually a momentary fall off in the mat pressure $P_r$ due to the increase in the available volume caused by the coalescing fibers.

The increased heat in the more closely packed mat immediately superheats whatever steam remains in the mat. This along with the hot fusion reaction volatiles fill and follow the network of microchannels developed during the compaction pause so that these hot gases are channeled very uniformly into very intimate reacting contact with substantially every fiber in the mat thereby enhancing and accelerating polymer crosslinking and branching and the secondary chemi-molecular fusion reaction generally. However, since there is essentially no free oxygen or moisture within the mat at this time, carbonization of the mat constituents does not occur.

Even though the mat is being compacted by the closing dies, the hot reaction gases generated in the mat are able to flow through the microchannels to the surfaces of the mat and out through the vented gas emission control plates 58. Consequently, full mat cross section equalizations of pressure and temperature occur at or before the dies are fully closed and the mat is fully consolidated to final caliper at maximum temperature and pressure as shown in FIG. 4. This maximum temperature is at least die temperature and may be as high as 600° F. due to the exothermic reactions occurring within the mat. The maximum die pressure may reach 500 to 2000 psi or more, depending upon the density desired for the finished product P.

Thus during this final compression of the mat M, the array of tiny, closely spaced microchannels developed in the mat during the aforementioned compaction pause channel superheated steam and volatiles from deep within the interior of the mat to the outside by way of the gas emission control plates 58. This controlled channeling via plate holes 62 relieves the gas pressure within the mat sufficiently to prevent blowout, yet provides back pressure to maintain the high gas pressure and temperature within the mat needed to promote and accelerate the secondary reaction occurring in the mat between the fibers and the other mat constituents and to ensure that the hot gases uniformly permeate the mat. The plates 58 and the orthogonal flow of gases from the mat through those plates minimizes overheating and carbonizing of the mat surfaces as described above. All of these conditions enhance thorough and uniform highly cross-linked, multiple-molecular restructuring and irreversible fusion bonding of the cellulose and other constituents of the mat.

When the mat has been completely consolidated, any supplemental heating (e.g. RF energy) applied to the mat is discontinued immediately and preferably the mat is held at this final density and caliper for a brief period in the order of 10 to 120 seconds. By this time, all fusion reactions will have been completed and all gases expelled from the mat through the collapsing microchannels as the mat becomes fully consolidated. Then, as shown in FIG. 3D, the dies are opened to release the finished product P from the press reactor 10 onto belt 42 (FIG. 1).

A product P processed in the press reactor 10 thusly is free of vapor entrapments, delaminations and blisters and has a very uniform density, composition and texture throughout its extent. Moreover its surfaces or faces are very smooth, even and free of precure defects and cracks. Interestingly, the product P made by my process is readily identifiable by the now fully collapsed "fossil" lignin remnants of the aforementioned microchannels C developed in the mat M as the product P was formed. These appear as very fine and densely packed slightly darker lines in the product cross section.

Medium and high density wood fiberboard made from my process exhibits superior properties of low lineal expansion (e.g. 0.21 to 0.35) sustaining dry breaking loads in the order of 400 psi under test and retaining 40% to 50% strength after exposure to a standard 6-cycle exterior weathering test. Also, due to the complete and very uniform chemi-molecular fusion bonding of the fibers which occurs in the mat being processed, the board product may contain far less catalyst and resin (e.g. less than 3%) than is required in comparable products of this type having similar properties. Since less binder material is required to form the finished product, there is less likelihood of the emission of toxic fumes from the product while the product is being made and when it is in use. Yet with all of these advantages, fiberboard and similar products can still be made quite efficiently and economically.

A fusion-bonded board product can also be made on a more or less continuous basis by introducing the preformed mat M as a continuous strip into the press reactor 10, i.e. without cutting the mat into sections. In this case, plate units 67 should be of the rolling transfer type shown on the lower die in FIG. 2 or formed as endless belts to assist advancing the mat strip. Alternatively, a continuous reaction can be carried out by a reactor similar to the ones described in my above-identified prior patent (FIGS. 10 and 11), but modified to include plate units 67 and operated as described above. As the mat strip passes through the reactor, the process steps described above are performed on each mat strip increment so that the bonded product leaves the reactor as a continuous strip.

Figure 6:
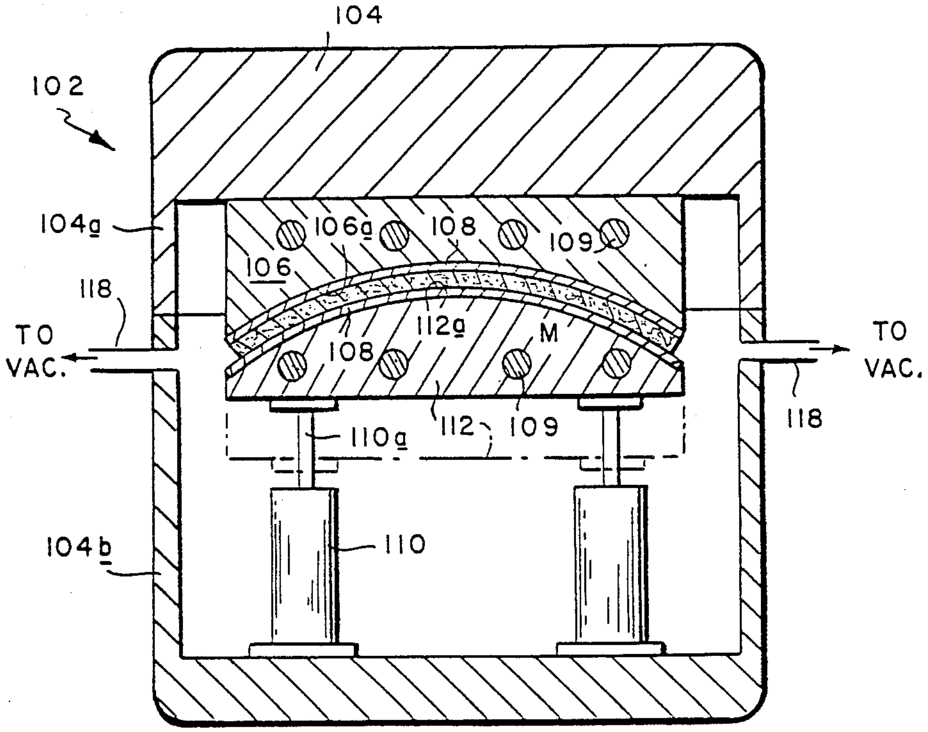
FIG. 6 is a cross sectional view of a modified press reactor for practicing my invention.

Refer now to FIG. 6 which shows another embodiment of my press reactor in the form of a compression mold for batch molding or laminating cellulose-containing products having various shapes. This reactor, shown generally at 102, comprises a rigid generally cylindrical housing 104 having separable upper and lower halves or sections 104*a* and 104*b* Removably mounted to the inside of housing section 104*a* is a female die 106 whose working surface 106*a* has the desired shape for the finished product. In the illustrated reactor 102, that surface is concave or dished. Mounted to surface 106*a* is a plate unit 108 similar to plate unit 67 described above. The die also has internal electric heating rods 109 which can be turned on to heat the die.

Mounted in housing section 104*b* is a pair of upstanding double-acting pistons 110 whose rods 110*a* support a die 112 whose working surface 112*a* lies opposite and mates with the first die surface 106*a*. A second plate unit 108 covers surface 112*a* and a second set of internal electric heaters 109 are provided to heat that die. Pistons 110 can be controlled to move die 112 from a lower fully open position indicated in phantom in FIG. 6 to an upper closed position shown in solid lines in that same figure. There is also one or more exhaust pipes 118 spaced around housing section 104*b* near its rim to remove steam and volatiles collected in housing 104 during the reaction process carried out therein. Preferably, these pipes lead to a negative pressure source so that reaction gases are withdrawn forcibly from the housing 104.

To form a product in reactor 102, housing section 104*a* is removed or swung away from section 104*b* and dies 106 and 112, with appropriately shaped mating surfaces, are mounted to housing section 104*a* and to the piston rods 110*a* respectively. Then a mat M, usually preformed, is laid on the plate unit 108 covering die 112. Alternatively, if a molded laminate is being formed, two or more congruent mats are positioned between the dies. With the pistons in their retracted positions, housing section 104*a* is positioned on and secured to section 104*b* to completely close the housing.

With the lower die 112 in its open position shown in phantom in FIG. 6, the die heating rods 109 are turned on and, being electric, they quickly raise the temperature of the dies 106 and 112 to an operating temperature of 300° F. to 500° F. When this temperature is approached, the pistons 110 are controlled to move die 112 toward its raised or closed position so that mat M is brought into contact with the upper die 106 and is compressed under a pressure in the order of 50 to 200 psi to compact it to, say, twice the final caliper of the finished product.

Then pistons 110 are controlled to initiate a pause or intermission (slowing or stopping) in the compaction process. By this time, the internal temperature of the mat M will have increased such that during this pause, a large volume of saturated steam and low temperature reaction volatiles is generated within the mat, as described above. Due to the gas emission control provided by the plate units 108, the wet steam and reaction volatiles develop a network of microchannels as described above extending from the deep interior of the mat to the upper and lower faces thereof at which point they pass through the plate units 108 and are exhausted from the housing.

Thus during this pause in the compaction process, while the internal temperature of the mat is still below the carbonizing temperature and well below the critical temperature at which the mat fibers irreversibly coalesce and fuse together, hot steam is forceably channeled uniformly into very intimate contact with all fibers within the mat to condition them for the secondary reaction and to dissolve the natural resin binder between the individual fibers as the steam follows the network of microchannels to the mat surfaces. These gases are allowed a rate of escape which assures very intimate contact with the mat fibers, yet which does not give rise to an excessive pressure within the mat as might cause a blowout. Still further, as noted above, the flow of the saturated steam and volatiles over the sheet units 108 cool those surfaces as well as the surfaces of the mat in contact therewith below the carbonizing temperature of the mat fibers so that there is essentially no premature carbonizing or discoloration of the mat surfaces.

At the end of the compaction intermission or pause which usually persists for about 10 to 120 seconds, the pistons 110 are controlled to close the dies to final caliper without interruption. The internal temperature of the mat rapidly reaches the critical temperature. However, by now, substantially all free oxygen and moisture will have been expelled or purged from the mat.

As the dies close and the mat is compressed under continuous consolidation to final caliper at full pressure, any small amount of residual steam is superheated and complete reaction-emission bonding of the mat constituents takes place. The secondary reaction gases follow the network of previously developed microchannels to the surfaces of the mat even as the mat density increases. In their passage, these hot reaction gases are brought uniformly into very intimate contact with all of the mat constituents, this intimacy being enhanced by the back pressures developed by the plate units 108. Resultantly, the internal chemical and molecular reactions occurring between the mat constituents are enhanced and accelerated and made very uniform throughout the entire mat.

As soon as the dies have closed to fully consolidate the mat at its final density and caliper, any supplemental heating applied to the mat is immediately stopped and the mat is preferably held at full die pressure for a brief period. Then the die is opened to release the final product. Even though the product is quite hot at this point, all of the internal fusion reactions will have been completed so that no further oxygen-induced reactions occur in the product that might tend to cause the carbonizing or discoloration thereof. The product discharged from reactor 102, like product P described above, has an unusually uniform density throughout, and essentially no internal voids or surface blisters or other irregularities. This molded product otherwise has all of the attributes and advantages described above in connection with product P.

Figure 7:
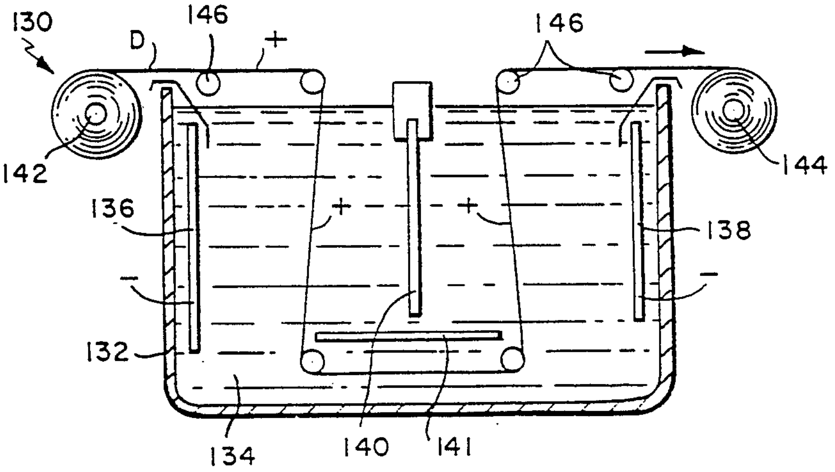
FIG. 7 is a cross sectional view illustrating apparatus for making the gas emission control plates used in the reactor in FIG. 1.

Refer now to FIG. 7 which shows apparatus for making the gas control emission plates 58. As described previously, each sheet should have holes or pores which are minute (i.e. diameters of 0.001 to 0.010 inch) and densely packed, i.e. 500 to 3000 holes/in.$^2$, providing a 20% to 40% gas transmission for surface emission control within the reactor. It is also important that the plate surface exposed to the mat be completely smooth and that the holes be of uniform diameter through the plate to assure accurate and uniform gas emission control and to further minimize hole plugging by the mat constituents.

One commonly used method of forming a distribution of densely packed tiny holes in a plate or sheet is by etching. However, when as here, the tiny holes are to be formed in a plate which is very thin, i.e. less than 0.015 inch, conventional etching processes cannot be used because they tend to produce holes which do not have uniform diameters through the plate. In other words, when a thin flexible plate is etched to form a hole, the hole has different diameters on opposite sides of the plate, i.e. it is conical. Such non-uniform holes make proper gas emission control more difficult; they also encourage plugging and clogging of the mat fibers. The two-side etching apparatus shown generally at 130 in FIG. 7 enables the making of thin gas emission control plates 58 whose holes have uniform diameters. We should mention at this point that when we describe the holes or pores in the gas emission control plates as having diameters, we do not mean to imply that the holes are necessarily round in a strict geometrical sense.

Apparatus 130 comprises a plastic container 132 which contains a 2% to 5% hydrochloric acid bath 134. Supported from the rim of the container at opposite sides thereof is a pair of negative plate electrodes 136 and 138. Supported midway between those electrodes is a third negative plate electrode 140, all of these electrodes being spaced parallel to one another. Spaced under electrode 140 is a horizontal nonconductive plate baffle 141.

A pair of letoff and take up rollers 142 and 144 are rotatively supported outside the container parallel to plates 136 and 138 respectively. Stretched between these rollers is a thin, e.g. 0.005 inch, strip D of sheet material. In the illustrated apparatus, the strip D is 304 or other 300 series stainless steel containing about 6% to 15% carbon. Appropriate guide rollers 146 are suspended from container 132 with their axes parallel to rollers 142 and 144 to guide strip D down between electrodes 136 and 140, under baffle 141 so that the strip is spaced parallel to that baffle, up between electrodes 140 and 138 and then to the take up roller 144. A rectified dc voltage is applied between the strip D (+) and the electrodes (−). This voltage may be single phase at one amp./in.$^2$ on each side of the strip or three-phase at two amps./in.$^2$ on two sides (220 V, 60 cycles).

The strip D is advanced through the bath 134 by rotating roller 144 so that a strip segment is exposed to the bath as shown for 5 to 20 minutes, depending upon the sheet thickness and the degree of permeability or transmission desired, e.g. 20% to 40%. In one working example, a six minute exposure of each increment of the strip to the bath produced a succession of plates having uniform holes averaging 0.004 inch in diameter and a hole density of about 1500 holes/in.$^2$, yielding a plate transmission factor of about 22%.

It will be seen from the foregoing then that the process and apparatus described above can make cellulose-containing products such as fiberboard, interior and exterior wallboard and other similar flat or molded products quite efficiently. A product made by my process and apparatus can be released directly into the work space upon formation. Yet it has an unusually high quality, being uniformly dense and free of voids, defects and surface blisters and discoloration. The product is advantaged also in requiring a minimal amount of binder that increases product cost and presents a potential toxic emission hazard.

It will thus be seen that the objects set forth above, among those made apparent from the preceding description are efficiently attained. Also, certain changes may be made in carrying out the above method and in the construction set forth and in the product formed without departing from the scope of the invention. For example, in some applications, the product precursor may be a woven mat on a woven or nonwoven web or sheet. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. In a method of producing a fusion bonded fiber product which comprises compressing a moisture-containing mat of fibers including at least one bonding agent between heated dies to a final density which is a multiple of its starting density while expelling gases through the compressed surfaces of the mat through gas emission control plates interposed between the compressed surfaces of the mat and the compression surfaces of said dies, the improvement wherein A. said dies are heated to a compress temperature of between about 300° F. and about 500° F.;

B. the compression of said mat is intervened before said mat has been compressed to the final caliper of said product by substantially terminating relative movement of said dies to maintain said mat under substantially the same compaction for a time period sufficient to allow the moisture content of said mat to be turned to saturated steam and be expelled from the mat by way of said plates while the mat temperature equalizes below the critical temperature of the mat fibers thereby preventing premature carbonizing of the mat fibers;

c. the compression of said mat to said desired caliper is thereupon continued by closing the heated dies without interruption to raise the interior temperature of the mat above said critical temperature to achieve thorough and uniform consolidation fusion bonding of the mat fibers.

2. The method according to claim 1 wherein said at least one bonding agent comprises a substantial proportion of cellulose and/or polyester-type fibers of said mat which are fused to form fiber-to-fiber bonds.

3. The method according to claim 1 wherein said at least one bonding agent comprises a binder additive.

4. The method according to claim 1 wherein said time period is between 10 and 120 seconds.

5. The method according to claim 1 wherein the die pressure used in compressing said mat does not exceed 2000 pounds per square inch.

6. The method according to claim 1 wherein the holes of at least one of said plates have substantially uniform diameters through the plate thickness in the range of 0.001 inch to 0.010 inch and a distribution in the plate of 500 to 3000 holes per square inch.

7. The method according to claim 1 wherein said at least one of said plates is of stainless steel, with a thickness between 0.002 inch and 0.010 inch, and is mounted on a more porous backing screen.

8. The method according to claim 1 wherein said at least one of said plates is a gas permeable web containing said holes on a more porous fibrous backing, said web and backing having the ability to withstand temperatures of at least 500° F.

9. The method according to claim 8 wherein said web is of PTFE.

10. The method according to claim 9 wherein said backing is of woven fiberglass.

11. The method according to claim 1 wherein said at least one of said plates is of micro-porous sintered metal.

* * * * *